Aug. 26, 1958    G. T. LEATHERMAN ET AL    2,849,515
REMOVAL OF OXYGEN FROM GASEOUS MIXTURES
Filed May 9, 1955
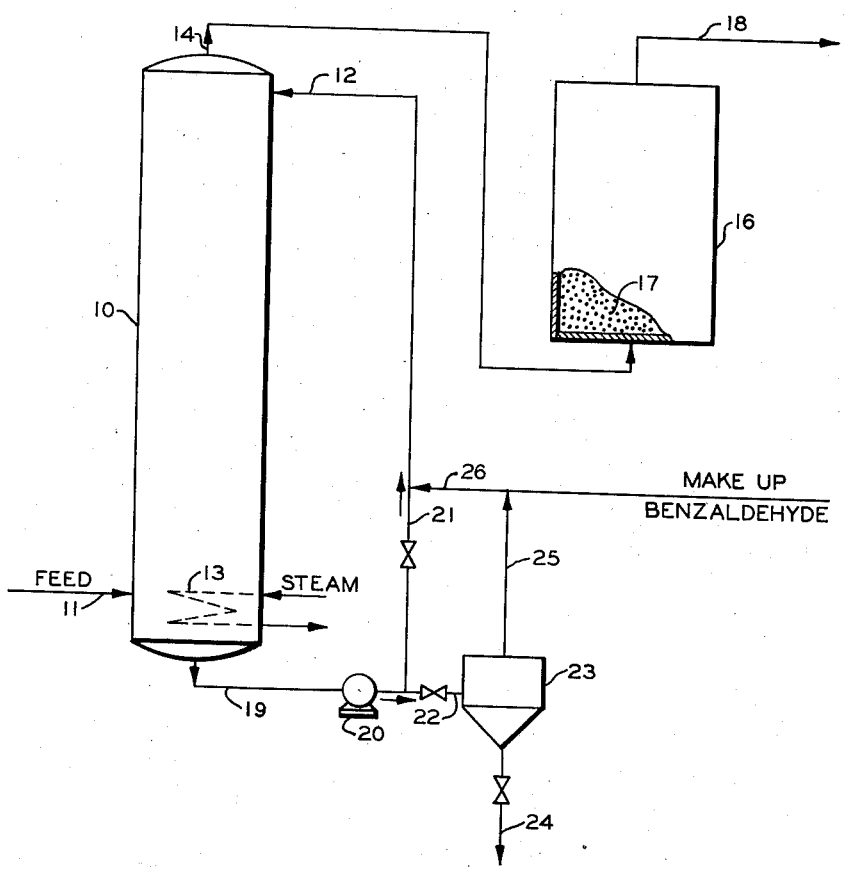
INVENTORS
G. T. LEATHERMAN
J. T. EDMONDS, JR.
BY Hudson and Young
ATTORNEYS

2,849,515
REMOVAL OF OXYGEN FROM GASEOUS MIXTURES

Gerald T. Leatherman and James T. Edmonds, Jr., Bartlesville, Okla., assignors to Phillips Petroleum Company, a corporation of Delaware Application May 9, 1955, Serial No. 506,692

7 Claims. (Cl. 260—677)

This invention relates to improvements in deoxygenation of gaseous hydrocarbon mixtures. In one aspect this invention relates to an improved method for the substantially complete removal of oxygen from gaseous hydrocarbon mixtures, particularly from unsaturated hydrocarbons.

Oxygen is often present in hydrocarbon streams as molecular oxygen in simple solution, as peroxides and in other less clearly understood forms which are in equilibrium with dissolved oxygen and have been termed "loosely combined oxygen." In many commercial processes and products the presence of dissolved or loosely combined oxygen in hydrocarbon materials is very objectionable. In the polymerization of olefins such as ethylene, for example, even small amounts of oxygen have a deleterious effect upon the polymerization reaction and it is desirable, for such polymerization reactions, to employ olefinic feed stocks from which substantially all of the oxygen impurity has been removed. This invention is directed to the substantially complete removal of dissolved oxygen and loosely combined oxygen from hydrocarbon materials, particularly olefinic feed stocks to be used in polymerization processes.

It is an object of this invention to provide an improved process for removing dissolved, admixed and loosely combined oxygen from liquid or gaseous hydrocarbon streams.

Another object is to provide an agent for removing oxygen from gaseous hydrocarbon streams which is normally liquid and which when combined with oxygen is converted into a solid.

Still another object is to provide a continuous process for the removal of oxygen from hydrocarbon streams wherein the oxygen removal is an irreversible reaction.

Further objects and advantages will be apparent to those skilled in the art upon study of this disclosure and the appended drawing.

In accordance with the present invention, we have discovered that oxygen can be substantially completely removed from gaseous hydrocarbon mixtures containing the same by contacting such mixtures with an aromatic aldehyde. The aromatic aldehyde with which the present invention is especially concerned comprise benzaldehyde and the mono-substituted derivatives of benzaldehyde. The mono-substituted derivatives of benzaldehyde that can be used in the present invention include m- and p-tolualdehyde, o- and p-chlorobenzaldehyde, o-, m- and p-nitrobenzaldehyde, m- and p-hydroxybenzaldehyde, o- and p-aminobenzaldehyde, salicylaldehyde, and the like, however, we prefer to use benzaldehyde.

Any suitable method of contacting the gases containing oxygen with the oxygen removal materials of the present invention may be employed. Thus, the oxygen in the oxygen-containing gaseous hydrocarbon mixture can merely be brought in contact with the oxygen removal materials per se. Likewise, if desired, a solution of one of the oxygen removal materials and a suitable liquid organic material such as a normally liquid hydrocarbon can be utilized. A particularly preferred liquid hydrocarbon is a substantially isoparaffinic hydrocarbon boiling in the range of about 335 to 550° F. The preferred procedure is to contact countercurrently and intimately the gaseous mixture containing oxygen with the liquid oxygen-removal material in a vertical tower provided with bubble plates or other contact elements such as packing, baffle plates, etc. It is preferred to operate the contacting zone at atmospheric or superatmospheric pressure and at temperatures ranging from room temperature to about 200° F. The pressure may range from atmospheric upwardly to any suitable superatmospheric pressure. The conditions of contacting should be such however that the oxygen-containing hydrocarbon mixture being treated remains in the gaseous phase. When the oxygen removal step is carried out at ambient temperatures and, particularly, at elevated pressures the concentration of oxygen removal material in the effluent gaseous mixture will be quite low owing to the low vapor pressure of the oxygen removal material. However, at lower contact pressures traces of oxygen removal material may be carried out of the contacting zone by the gaseous mixture being treated, and the oxygen removal material can be removed from the gaseous mixture, if desired, by adsorption on, for example, alumina.

The maximum space velocity of the hydrocarbon mixture being deoxygenated should be such that a minimum of oxygen scavenger is entrained in the effluent gases. The minimum space velocity will be dictated by economic considerations. The reaction contemplated is instantaneous and irreversible within the conditions set forth, therefore, it is only necessary to contact the oxygen in the hydrocarbon mixture with the oxygen scavenger.

The oxygen removal materials of the present invention may be utilized to substantially completely remove oxygen from any oxygen-containing gaseous hydrocarbon mixture. It is also contemplated that the oxygen removal materials of the present invention may be employed to remove dissolved, admixed, and loosely combined oxygen from liquid hydrocarbon mixtures. The method of the present invention is particularly useful for removing oxygen from normally gaseous olefins such as ethylene, propylene, and the like, or a mixture of olefins, which are to be used as feedstock for a polymerization process such as that disclosed in copending application Serial No. 476,306, filed December 20, 1954, by J. P. Hogan and R. L. Banks. It has been found that in the polymerization of 1-olefins to high molecular weight polymers in the presence of chromium oxide-containing catalysts, oxygen and water exert undesirable effects, i. e., markedly reduce the yield of desired polymers, substantially reduce the life of the polymerization catalyst and, in some instances, adversely affect the reaction rate. Removal of oxygen from the polymerization feed with benzaldehyde, for example, possesses several advantages over known methods of oxygen removal. First of all, practically 100 percent removal can be obtained at room temperature, and, secondly, water, which kills off the polymerization catalyst, is not introduced into the reactor as it would be if, for example, the oxygen were burned out.

In actual operation, the benzaldehyde is oxidized to benzoic acid by the oxygen in the gaseous mixture being treated. By the method of the present invention the oxygen content of a given gas, such as commercial ethylene, can be reduced to approximately 1 part per million, or to an oxygen content which is so low as to fall within the range of experimental error in its determination.

It is known that many materials absorb oxygen from the atmosphere. Some of these oxygen absorbing materials, such as metallic copper and iron, have been proposed and used for the removal of oxygen from hydrocarbon streams, such as ethylene feed stocks for polymerization reactions. Metallic oxygen scavengers, however, are not entirely satisfactory because several treatments at a relatively high temperature are required for satisfactory removal of oxygen. Furthermore, if hydrogen is present in the hydrocarbon stream treated, the metal oxide will react with the hydrogen to form water.

The adverse effects exhibited by trace amounts of oxygen in the feed stream to a process for the polymerization of ethylene over a chromium oxide-containing catalyst in mixed phase operation is shown in the following Table I. As can be seen from these data, as little as 60 p. p. m. oxygen has an adverse effect on both reaction rate and on yield of polymer.

TABLE I

*Effect of oxygen on ethylene polymerization*

| Run number | 1 | 2 |
| --- | --- | --- |
| Oxygen content, p. p. m., ±5 | 60 | 5 |
| Feed rate, grams/hr.[a] | 200 | 200 |
| Feed composition, percent: | | |
| Ethylene | 95 | 95 |
| Propylene | 5 | 5 |
| Reaction temperature, ° F, ±5 | [b] 265 | [c] 265 |
| Catalyst, grams, ±1 | 40 | 40 |
| Isooctane, lbs | 6.14 | 6.14 |
| Reaction pressure, p. s. i. g | 292 | [a] 210 |
| Hours on stream to reach reaction pressure | 1½ | 5 |
| Total hours on stream | [a] 3 | 8 |
| Lbs. polymer/lb. catalyst | [d] | 37 |

[a] The ethylene is initially fed at the rate indicated. When the pressure builds up to the control point, the feed rate is automatically reduced to that required to maintain the pressure. In run 2, the control point was 292 p. s. i. g. (as in run 1), but in run 2, the reaction rate was too high to permit the pressure to build up to this value at the feed rate used. The total hours on stream represents the time required for the reaction rate to decrease to the point where practically no ethylene is being fed.
[b] No heat of reaction was detected in this run.
[c] All reactor heating was shut off at between two and three hours on stream owing to heat of reaction.
[d] The amount of polymer was so small that it was not weighed. The yield was estimated to be less than three pounds per pound of catalyst.

The attached drawing illustrates diagrammatically one preferred system for conducting the process of this invention. Referring thereto, a hydrocarbon feed stream, for example an ethylene stream containing dissolved, admixed or loosely combined oxygen, is supplied to a vessel 10 through feed entry 11. The vessel 10 is designed to provide countercurrent contacting of the hydrocarbon feed which enters near the bottom of the vessel at feed entry 11 and benzaldehyde which is introduced into the top of the vessel at inlet 12. Vessel 10 can be a bubble plate tower, a packed tower or other vessel designed for contacting one liquid with another or for contacting a liquid with a gas. Heat can be supplied to the vessel 10 by means of steam coil 13 located near the bottom of the vessel. Effluent gases from which oxygen has been substantially removed leave the vessel 10 and 14 and are conducted by line 15 to a vessel 16 which can be packed with an adsorbent material 17 such as alumina. The packed vessel 16 acts as a guard chamber so as to remove any oxygen removal material which may be carried out of vessel 10. Deoxygenated hydrocarbon gases pass out of vessel 16 through line 18 and are passed to a storage means (not shown). Liquid benzaldehyde or benzaldehyde dissolved in an inert solvent is removed from vessel 10 through line 19, and is recycled by means of pump 20 and line 21 to inlet 12, however, it is usually preferred to pass the benzaldehyde from pump 20 through line 22 to vessel 23 wherein solid benzoic acid settles out and is removed through line 24. Benzaldehyde, from which benzoic acid has been removed, is then passed through lines 25 and 26 to recycle line 21. Benzaldehyde required to replenish that which has been converted to benzoic acid is supplied to the system through line 26 from a source (not shown).

The following example illustrates how the invention can be practiced but should not be construed so as to limit the invention.

EXAMPLE I

A solution of 1000 cc. by volume of benzaldehyde and 1950 cc. by volume of heavy alkylate, a substantially isoparaffinic hydrocarbon fraction boiling in the range of about 420° F. to about 475° F., was charged to a vertical column 2 inches in diameter and about 5 feet in height. Pure grade ethylene containing 940 p. p. m. oxygen was introduced near the bottom of the column through a fritted steel disk at a rate of 60 liters per hour. The pressure was maintained at 380 p. s. i. g. and the temperature was maintained at 100° F. At the end of 8 hours the effluent ethylene contained 1.1 p. p. m. oxygen and at the end of 34 hours the effluent ethylene contained 1.3 p. p. m. oxygen.

Variations and modifications are possible within the scope of the disclosure of the present invention, the essence of which is the discovery that aromatic aldehydes, particularly benzaldehyde and mono-substituted derivatives of benzaldehyde will substantially completely remove oxygen from a hydrocarbon stream containing oxygen.

That which is claimed is:

1. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with a stoichiometric excess of an aromatic aldehyde selected from the group consisting of benzaldehyde, tolualdehyde, chlorobenzaldehyde, hydroxy-benzaldehyde, and aminobenzaldehyde dissolved in a normally liquid hydrocarbon in said reaction zone at a pressure in the range of about atmospheric to about 600 p. s. i. g., and a temperature in the range of about room temperature to about 200° F. so that the aromatic aldehyde reacts with the oxygen to form the corresponding aromatic acid; withdrawing a liquid slurry of said aromatic acid in a solution of said aromatic aldehyde in said liquid hydrocarbon; recovering aromatic acid from said slurry as a product of the process; adding aromatic aldehyde to said reaction zone to replace aromatic aldehyde converted to aromatic acid; removing a gaseous, substantially oxygen-free, ethylene-containing stream from said reaction zone; passing said substantially oxygen-free stream to an adsorption zone packed with an adsorbent material so as to adsorb entrained aromatic aldehyde and liquid hydrocarbon; and recovering a substantially oxygen-free, ethylene-containing stream from said adsorption zone as an additional product of the process.

2. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with a stoichiometric excess of benzaldehyde dissolved in a normally liquid hydrocarbon in said reaction zone at a pressure in the range of about atmospheric to about 600 p. s. i. g., and a temperature in the range of about room temperature to about 200° F., so that the benzaldehyde reacts with the oxygen to form benzoic acid; withdrawing a liquid slurry of said benzoic acid in a solution of said benzaldehyde in said liquid hydrocarbon; recovering benzoic acid from said slurry as a product of the process; adding benzaldehyde to said reaction zone to replace benzaldehyde converted to benzoic acid; removing a gaseous substantially oxygen-free, ethylene-containing stream from said reaction zone; passing said substantially oxygen-free stream to an absorption zone packed with an adsorbent material so as to adsorb entrained benzaldehyde and liquid hydrocarbon; and recovering a substantially oxygen-free, ethylene-containing stream from said adsorption zone as an additional product of the process.

3. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with a stoichiometric excess of tolualdehyde dissolved in a normally liquid hydrocarbon in said reaction zone at a pressure in the range of about atmospheric to about 600 p. s. i. g., and a temperature in the range of about room temperature to about 200° F., so that the tolualdehyde reacts with the oxygen to form the corresponding toluic acid; withdrawing a liquid slurry of said toluic acid in a solution of said tolualdehyde in said liquid hydrocarbon; recovering toluic acid from said slurry as a product of the process; adding tolualdehyde to said reaction zone to replace tolualdehyde converted to toluic acid; removing a gaseous substantially oxygen-free, ethylene-containing stream from said reaction zone; passing said substantially oxygen-free stream to an adsorption zone packed with an adsorbent material so as to adsorb entrained tolualdehyde and liquid hydrocarbon; and recovering a substantially oxygen-free, ethylene-containing stream from said adsorption zone as an additional product of the process.

4. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with a stoichiometric excess of chlorobenzaldehyde dissolved in a normally liquid hydrocarbon in said reaction zone at a pressure in the range of about atmospheric to about 600 p. s. i. g., and a temperature in the range of about room temperature to about 200° F., so that the chlorobenzaldehyde reacts with the oxygen to form the corresponding chlorobenzoic acid; withdrawing a liquid slurry of said chlorobenzoic acid in a solution of said chlorobenzaldehyde in said liquid hydrocarbon; recovering chlorobenzoic acid from said slurry as a product of the process; adding chlorobenzaldehyde to said reaction zone to replace chlorobenzaldehyde converted to chlorobenzoic acid; removing a gaseous substantially oxygen-free, ethylene-containing stream from said reaction zone; passing said substantially oxygen-free stream to an adsorption zone packed with an adsorbent material so as to adsorb entrained chlorobenzaldehyde and liquid hydrocarbon; and recovering a substantially oxygen-free, ethylene-containing stream from said adsorption zone as an additional product of the process.

5. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with a stoichiometric excess of hydroxy-benzaldehyde dissolved in a normally liquid hydrocarbon in said reaction zone at a pressure in the range of about atmospheric to about 600 p. s. i. g., and a temperature in the range of about room temperature to about 200° F., so that the hydroxy-benzaldehyde reacts with the oxygen to form the corresponding hydroxy-benzoic acid; withdrawing a liquid slurry of said hydroxy-benzoic acid in a solution of said hydroxy-benzaldehyde in said liquid hydrocarbon; recovering hydroxy-benzoic acid from said slurry as a product of the process; adding hydroxybenzaldehyde to said reaction zone to replace hydroxy-benzaldehyde converted to hydroxy-benzoic acid; removing a gaseous substantially oxygen-free, ethylene-containing stream from said reaction zone; passing said substantially oxygen-free stream to an adsorption zone packed with an adsorbent material so as to adsorb entrained hydroxy-benzaldehyde and liquid hydrocarbon; and recovering a substantially oxygen-free, ethylene-containing stream from said adsorption zone as an additional product of the process.

6. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with a stoichiometric excess of aminobenzaldehyde dissolved in a normally liquid hydrocarbon in said reaction zone at a pressure in the range of about atmospheric to about 600 p. s. i. g., and a temperature in the range of about room temperature to about 200° F., so that the aminobenzaldehyde reacts with the oxygen to form the corresponding aminobenzoic acid; withdrawing a liquid slurry of said aminobenzoic acid in a solution of said aminobenzaldehyde in said liquid hydrocarbon; recovering aminobenzoic acid from said slurry as a product of the process; adding aminobenzaldehyde to said reaction zone to replace aminobenzaldehyde converted to aminobenzoic acid; removing a gaseous substantially oxygen-free, ethylene-containing stream from said reaction zone; passing said substantially oxygen-free stream to an adsorption zone packed with an adsorbent material so as to adsorb entrained aminobenzaldehyde and liquid hydrocarbon; and recovering a substantially oxygen-free, ethylene-containing stream from said adsorption zone as an additional product of the process.

7. A process for the substantially complete removal of oxygen from a polymerization process feed stream containing ethylene and less than 1 weight percent oxygen which comprises continuously passing said ethylene-containing stream to a reaction zone; intimately contacting said ethylene-containing stream with an excess of benzaldehyde dissolved in a substantially isoparaffinic liquid hydrocarbon fraction boiling in the range from about 335° F. to about 550° F. in said reaction zone at a pressure in the range of about atmospheric to about 600 p. s. i. g., and a temperature in the range of about room temperature to about 200° F. so that benzaldehyde reacts with the oxygen to form benzoic acid; withdrawing a liquid slurry of benzoic acid in a solution of benzaldehyde in said liquid hydrocarbon; recovering benzoic acid from said slurry as a product of the process; returning said solution of benzaldehyde in said liquid hydrocarbon to said reaction zone; adding an amount of benzaldehyde to said reaction zone equivalent to the benzoic acid produced; removing a gaseous, substantially oxygen-free, ethylene-containing stream from said reaction zone; passing said substantially oxygen-free stream to an adsorption zone substantially filled with an adsorbent material so as to adsorb entrained benzaldehyde and liquid hydrocarbon; and recovering a substantially oxygen-free, ethylene containing stream from said adsorption zone as an additional product of the process.

References Cited in the file of this patent

UNITED STATES PATENTS 2,351,167    Ware et al. _____ Jan. 13, 1944

FOREIGN PATENTS 565,991    Great Britain _____ Dec. 7, 1944

OTHER REFERENCES

Fieser and Fieser, "Organic Chemistry," pages 707–709, publ. by D. C. Heath & Co., Boston, Mass. (1944).

Richter, "The Chemistry of the Carbon Compounds," Third English Edition, vol. II, pages 269 and 275, publ. by Elsevier Pub. Co., Inc., New York, N. Y. (1946).

UNITED STATES PATENT OFFICE
CERTIFICATE OF CORRECTION

August 26, 1958

Patent No. 2,849,515

Gerald T. Leatherman et al.

It is hereby certified that error appears in the printed specification of the above numbered patent requiring correction and that the said Letters Patent should read as corrected below.

Column 1, line 56, for "aldehyde", second occurrence, read -- aldehydes --; column 3, line 56, for "and", first occurrence, read -- at --; column 4, line 72, for "absorp-" read -- adsorp- --; column 6, line 61, list of references cited, under "UNITED STATES PATENTS" for "Jan. 13, 1944" read -- June 13, 1944 --.

Signed and sealed this 27th day of January 1959.

(SEAL)
Attest:

KARL H. AXLINE
Attesting Officer

ROBERT C. WATSON
Commissioner of Patents